US009990638B1

(12) United States Patent
Caldwell et al.

(10) Patent No.: US 9,990,638 B1
(45) Date of Patent: *Jun. 5, 2018

(54) PROVIDING DATA MESSAGING SUPPORT BY INTERCEPTING AND PROCESSING RECEIVED SHORT MESSAGE SERVICE (SMS) MESSAGES AT A CUSTOMER SUPPORT SERVICE

(71) Applicant: West Corporation, Omaha, NE (US)

(72) Inventors: Adam Caldwell, Omaha, NE (US); Jeffrey William Cordell, Omaha, NE (US); James K. Boutcher, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/407,524

(22) Filed: Jan. 17, 2017

Related U.S. Application Data

(63) Continuation of application No. 14/988,971, filed on Jan. 6, 2016, now Pat. No. 9,549,300, which is a continuation of application No. 14/059,048, filed on Oct. 21, 2013, now Pat. No. 9,232,373.

(51) Int. Cl.
| | |
|---|---|
| *H04W 4/14* | (2009.01) |
| *G06Q 30/00* | (2012.01) |
| *H04L 12/58* | (2006.01) |
| *H04M 3/51* | (2006.01) |

(52) U.S. Cl.
CPC ........... *G06Q 30/016* (2013.01); *H04L 51/02* (2013.01); *H04L 51/18* (2013.01); *H04M 3/5183* (2013.01); *H04W 4/14* (2013.01)

(58) Field of Classification Search
CPC .... G06Q 10/1095; H04M 3/565; H04M 3/56; H04W 4/06; H04W 4/14; H04W 8/02; H04L 63/08; H04L 9/3247
USPC ............ 455/416, 414.1; 705/347; 379/88.23, 379/93.91; 709/206
See application file for complete search history.

(56) References Cited

U.S. PATENT DOCUMENTS

| | | | | |
|---|---|---|---|---|
| 2011/0320293 | A1* | 12/2011 | Khan | ................. G06Q 20/0457 705/16 |
| 2013/0065569 | A1* | 3/2013 | Leipzig | ................... H04W 8/22 455/416 |

* cited by examiner

Primary Examiner — Phuoc H Doan
(74) Attorney, Agent, or Firm — Raffi Gostanian

(57) ABSTRACT

A message receiving, intercepting and processing method and corresponding application and device may provide receiving a message at a message processing server, the message being intended for a phone number associated with a customer service provider, identifying a telephone number of the sender of the message, parsing at least one word from the message, retrieving user account information of the sender, and generating an automated response to the message that includes contextual information that is based on at least one of the user account information and the parsed at least one word from the message.

20 Claims, 17 Drawing Sheets

Unverified messages for: Thanks

*Appreciation (Thank you, etc) by itself. Things that you would respond "You're welcome" to.*

| Correct | Incorrect | |
|---|---|---|
| ● | ○ | thanks min.rohn hayes sr. |
| ● | ○ | ok gracias enseguida paso. |
| ● | ○ | thnk u |
| ● | ○ | linda s ok thank you |
| ● | ○ | parking lot |
| ● | ○ | thank u. francisca |
| ● | ○ | thank you doug |
| ● | ○ | ok thanks *r.i.p.momma* |
| ● | ○ | thanks guys ... :-) |
| ● | ○ | thank you ~$shorty$ |
| ● | ○ | will pick it up.thanks |
| ● | ○ | thanks jerry (2) |
| ● | ○ | ok great, thank you. :) |
| ● | ○ | thank u gerry |
| ● | ○ | thx you (5) |

Verify / Next

FIG. 2G

PROVIDING DATA MESSAGING SUPPORT BY INTERCEPTING AND PROCESSING RECEIVED SHORT MESSAGE SERVICE (SMS) MESSAGES AT A CUSTOMER SUPPORT SERVICE

CROSS-REFERENCE TO RELATED APPLICATIONS

The present patent application is a continuation of and claims priority from patent application Ser. No. 14/988,971, titled PROVIDING DATA MESSAGING SUPPORT BY INTERCEPTING AND PROCESSING RECEIVED SHORT MESSAGE SERVICE (SMS) MESSAGES AT A CUSTOMER SUPPORT SERVICE, filed Jan. 6, 2016, which is a continuation of and claims priority from patent application Ser. No. 14/059,048, titled PROVIDING DATA MESSAGING SUPPORT BY INTERCEPTING AND PROCESSING RECEIVED SHORT MESSAGE SERVICE (SMS) MESSAGES AT A CUSTOMER SUPPORT SERVICE, filed Oct. 21, 2013, now issued U.S. Pat. No. 9,232,373, the entire contents of all of which are enclosed by reference herein in their entirety.

TECHNICAL FIELD OF THE INVENTION

This application relates to a method and apparatus of intercepting short message service (SMS) type messages received at a non-SMS source, and more particularly, to intercepting received SMS messages and redirecting the messages to a response source that provides feedback.

BACKGROUND OF THE INVENTION

Users of mobile phones and related computing devices are relying on short message service (SMS) or text messages more frequently every day to communicate with others, automated response systems, etc. Many users have attempted sending a text message to a landline or non-SMS compliant telephone number only to receive a negative response that the message was not received and cannot be sent (i.e., return to sender).

Generally, SMS messages are received from users and forwarded to their intended destination without any level of additional interception, message processing, message interpretation, etc. If a SMS message cannot be delivered, the responses are generally limited to an error message. Since SMS messages are continuing to become increasingly popular, the amount of processing, forwarding, interpretation, word replacement, word pairing with other terms and variables, etc., will continue to increase to maximize the SMS interpretation potential.

SUMMARY OF THE INVENTION

One embodiment of the present invention may include a method that provides receiving a message at a message processing server, identifying the received message as including text information, identifying the intended recipient of the message as an automated response subscriber, and generating a response message on behalf of the automated response subscriber.

Another example embodiment of the present application may provide an apparatus that includes a receiver configured to receive a message, and a processor configured to identify the received message as including text information, identify the intended recipient of the message as an automated response subscriber, and generate a response message on behalf of the automated response subscriber.

Another example method may include receiving a message at a message processing server, the message being intended for a phone number associated with a customer service provider, identifying a telephone number of the sender of the message, parsing at least one word from the message, retrieving user account information of the sender, and generating an automated response to the message that includes contextual information that is based on at least one of the user account information and the parsed at least one word from the message.

Another example embodiment may include an apparatus that includes a receiver configured to receive a message intended for a phone number associated with a customer service provider and a processor configured to identify a telephone number of the sender of the message, parse at least one word from the message, retrieve user account information of the sender, and generate an automated response to the message that includes contextual information that is based on at least one of the user account information and the parsed at least one word from the message.

Another example embodiment may include a method that includes receiving a message intended for a particular recipient at a message processing server, identifying at least one of a sender of the message and context of the message as being part of a predefined list of information included in a user profile account of the intended recipient, generating an automated response, and transmitting the automated response to the sender without alerting the user of the mobile station.

Yet another example embodiment may include an apparatus that includes a receiver configured to receive a message intended for a particular recipient and a processor configured to identify at least one of a sender of the message and context of the message as being part of a predefined list of information included in a user profile account of the intended recipient, generate an automated response, and a transmitter configured to transmit the automated response to the sender without alerting the user of the mobile station.

Still yet another example may provide a method that includes receiving a message at a message processing server, pre-processing the message to determine a particular contextual classification associated with at least one word included in the message and assigning the message to a predefined message bucket comprising a plurality of automated responses. The method may further include identifying an automated response to the message that includes contextual information that is based on the parsed at least one word from the message, and processing the message to determine whether to generate the automated response and transmit the automated response to an end user device based on a confidence score.

Still yet further another example embodiment may include an apparatus that provides a receiver configured to receive a message at a message processing server, and a processor configured to pre-process the message to determine a particular contextual classification associated with at least one word included in the message, assign the message to a predefined message bucket comprising a plurality of automated responses, identify an automated response to the message that includes contextual information that is based on the parsed at least one word from the message, and process the message to determine whether to generate the automated response and transmit the automated response to an end user device based on a confidence score.

BRIEF DESCRIPTION OF THE DRAWINGS

FIG. 2F illustrates another example graphical user interface application of automated message processing and bucket classification according to example embodiments of the present application.

FIG. 2G illustrates yet another example graphical user interface application of automated message processing for unverified messages for a particular bucket classification according to example embodiments of the present application.

DETAILED DESCRIPTION OF THE INVENTION

Figure 1A:
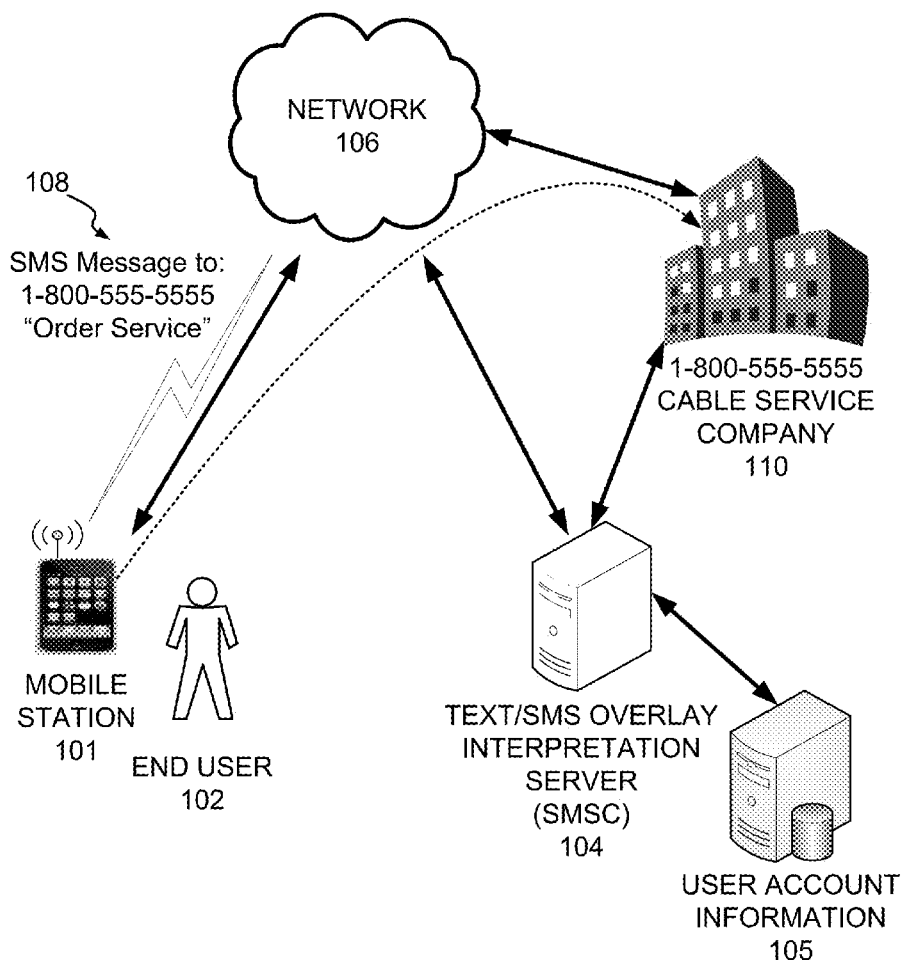
FIG. 1A illustrates an example network configuration for receiving and processing SMS messages, according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to one example embodiment of the present application, a user may transmit a text message via a short messaging service (SMS) on his or her smartphone or computing device to a well-known telephone number that may not be associated with a wireless subscriber or other telecommunications platform that normally offers SMS data services. The device may be a computer, laptop, mobile, wireless or cellular phone, a PDA, a table, a client a server or any device that contains a processor and/or memory, whether that processor or memory performs a function related to an embodiment of the invention.

SMS data processing systems may be overlaid onto existing cellular and related wireless telecommunications platforms. For example, SMS infrastructures, such as a value-added service provider (VASP) may provide the SMS messages by transferring the SMS messages to the mobile operator's short message service center SMSC using a TCP/IP protocol such as the short message peer-to-peer protocol (SMPP) or the external machine interface (EMI). The SMSC may deliver the text message using a standard mobile terminated delivery procedure.

FIG. 1A illustrates an example communication network 100 according to example embodiments. Referring to FIG. 1A, a SMS message may be received, identified, intercepted and processed on behalf of a toll free telephone number not normally associated with SMS messaging. The network 100 includes an end user 102 who may initiate a SMS message 108 via his or her mobile station 101. The message may be transmitted to a network 106, which represents the user's cellular carrier, mobile network, WiFi network and/or a PSTN. The cable company 110 in this example is a well established cable company with a popular toll free number ("1-800" number) that is dialed many times per day by users throughout the subscriber area offered by the service company.

In operation, the user 102 may initiate and transmit a SMS message to the telephone number 1-800-555-5555 to reach the cable company 110. The SMS message may include information regarding a user account and more specific information, such as "upgrade service", "order movie", "cancel service", "change service", "subscribe", etc. As a result, the SMS message would normally be rendered invalid with an automated response sent back from the subscriber service (i.e., "return to sender") indicating that the landline is not subscribed to a SMS service. However, a text/SMS overlay interpretation server 104 providing a SMSC function may be configured to identify the contents of the SMS message and intercept the message prior to a negative response being generated.

The SMS server 104 may also be configured to intercept the SMS message 108, forward the message to a database for identification of possible subscriber services currently associated with the cable company and related automated response services. Additionally, the SMS server 104 may be configured to parse the contents of the message and provide the parsed information to a calling service or callback service to contact the interested customer. The phone number of the recipient mobile station 101 may also be identified via the SMS message and used to retrieve a customer record from the database 105, identify user account status (i.e., paying customer), account profile (i.e., platinum member, gold member, silver member), account preferences (i.e., sports packages, movie packages, kids channels, etc.) and offer the appropriate information in response to the SMS message 108 received.

Figure 1B:
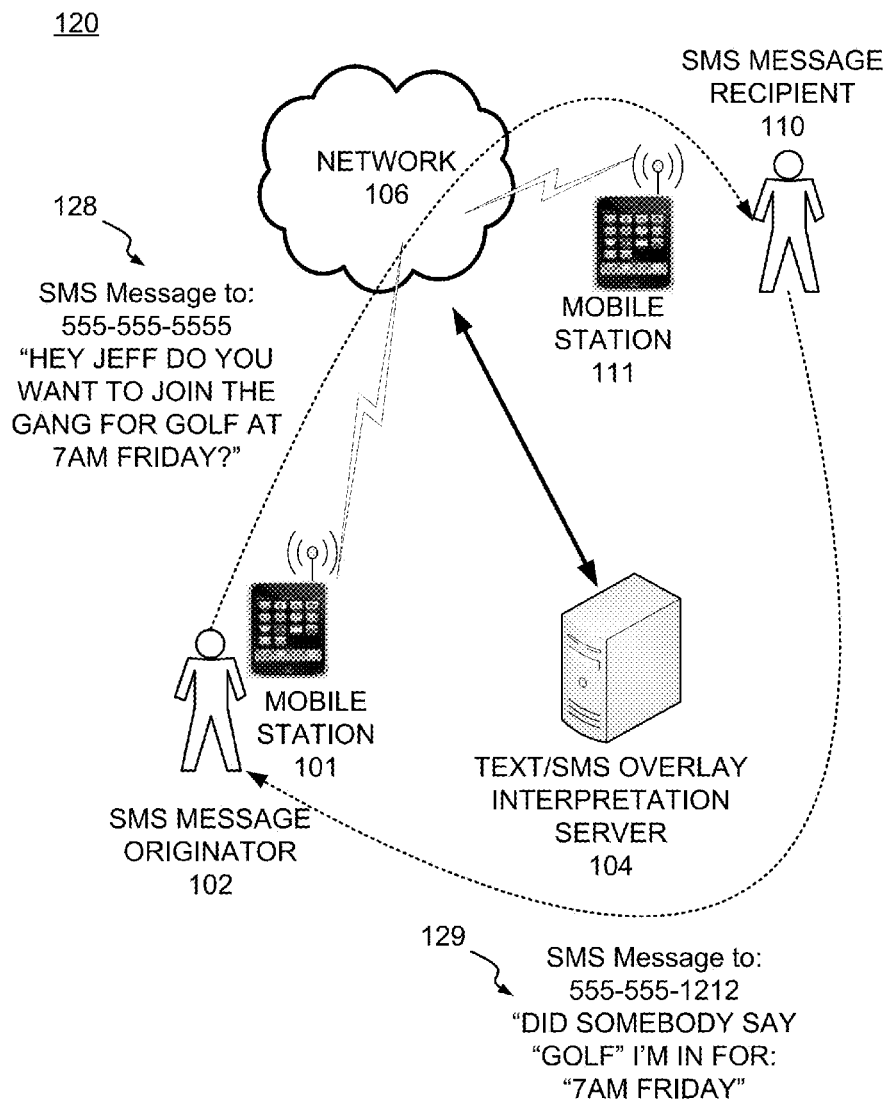
FIG. 1B illustrates another example network configuration for receiving and processing SMS messages, according to example embodiments of the present invention.

According to another example embodiment, FIG. 1B illustrates an example communication network 120 with a SMS message being transmitted from a first user to a second user and receiving an automated response in the process. Referring to FIG. 1B, the network 120 includes an end user 102 who may initiate a SMS message 128 via his or her mobile station 101 destined for another mobile station 111. The message may be transmitted to a network 106, which represents the user's cellular carrier, mobile network, WiFi network and/or PSTN. The other user 110 in this example is a user who has subscribed to an automated response platform via a mobile application operated on his or her mobile station 111.

In operation, the first (originator) user 102 may initiate and transmit a SMS message to the telephone number 555-555-5555 to reach the second (recipient) user 110. The SMS message may include information regarding a desire to connect or setup an appointment with a friend, acquaintance, etc. As a result, the SMS message 128 would generally be received by the recipient mobile station 111 via the network 106. However, in this example, a text/SMS overlay interpretation server 104 may provide a SMSC function that is configured to receive, intercept, process, and identify the contents of the SMS message and determine the sender's identity and an appropriate response based on the sender's identity and/or the contents of the SMS message. For example, if the sender 102 transmits a message to his friend "Hey Jeff do you want to join the gang for golf at 7 am Friday?" soliciting a response, then the automated response application operating on the user's mobile station may be setup to identify the sender by a categorization parsing function. The application may also be capable of parsing keywords from the message to include an automated response to such keywords based on the category of user.

The interpretation server 104 may break down the SMS message contents to identify how to process the message. For example, the message included the word "Jeff", which is the recipient's user name or is associated with the user's account, this may automatically identify the sender as a friend or someone who receives preferential treatment in an automated response. Also, the sender may be identified by his or her mobile station number, which is used to invoke a social networking application that identifies the sender and the recipient's relationship with the sender. The sender may be a friend, family, co-worker, other group of friends, or, a completely unknown sender with respect to the social networking account of the recipient. The recipient may have a plurality of different automated responses to the various circles or groups of friends. For example, co-workers may receive an alternative contact option, such as another phone number, an email, a best time to get in touch with the user, etc. A family member may receive more personal information in an automated response, such as a private number, information about the user's current status, etc. A friend may receive a comical response, such as "I'm too busy golfing in Palm Springs right now, but I'll catch up with you later . . . maybe . . . "

Continuing with the same example, the phrase received by the interpretation server 104 may be further processed to identify the question mark "?" as a question that needs an answer, a reference to the "gang", a time "7 AM", a day "Friday" and the term "Golf" may also be used to solicit an intelligent automated response. For example, the recipient may have keywords of interest, which are setup in the user's profile stored in the interpretation server 104. Anytime, one of his friends, from a list of preferred friends, texts him with the term "gang" or "golf" he may be able to provide an automated response that says, Yes assuming the time is ok. A calendar application may also be initiated when it is time to schedule the golf outing. The calendar application may automatically setup to pre-populate a time and event received from the SMS message depending on the level of priority. For example, any "gang" and "golf" appointments may take high priority and be auto-populated into the user's calendar along with a response affirming the user's acceptance without consulting the user or requiring his or her response.

In this same example, the user's device 111 may not receive the SMS message, however, the text interpretation server 104 effectively intercepted the message, identified the user's SMS message interpretation privileges, identified the user's calendar application, and created a response to accept the invitation without ever transmitting the SMS message to the recipient device 111. The device may have been off during a plane trip in which the user accepted golf with his "gang" of friends at 7 Am on Friday without receiving, responding or acknowledging the message.

Figure 1C:
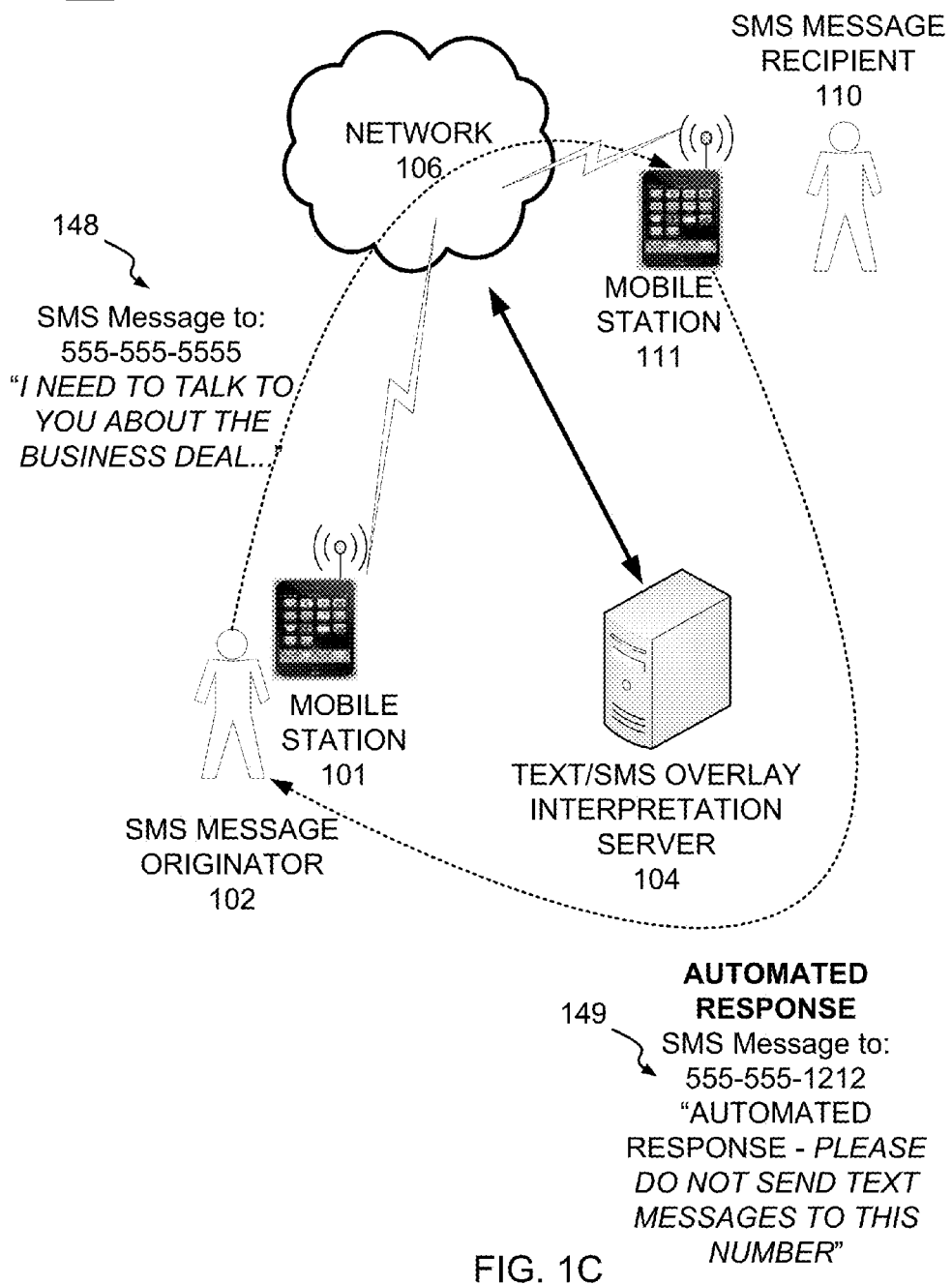
FIG. 1C illustrates yet another example network configuration for receiving and processing SMS messages, according to example embodiments of the present invention.

FIG. 1C illustrates another example communication network 140 with a SMS message being transmitted from a first user to a second user and receiving an automated response. Referring to FIG. 1C, the network 140 includes an end user 102 who may initiate a SMS message 148 via his or her mobile station 101. The message may be transmitted to a network 106, which represents the user's cellular carrier, mobile network, WiFi network and/or PSTN. The other user 110 in this example is a user who has subscribed to an automated response platform via a mobile application operated on his or her mobile station 111.

In operation, the first (originator) user 102 may initiate and transmit a SMS message to the telephone number 555-555-5555 to reach the second (recipient) user 110. The SMS message may include information regarding a desire to connect discuss a certain "business deal." As a result, the SMS message 148 would generally be received by the recipient mobile station 111 via the network 106. However, in this example, a text/SMS response overlay interpretation server 104 may provide a SMSC function that is configured to identify the contents of the SMS message and determine the sender's identity and an appropriate response based on the sender's identity and/or the contents of the SMS message. For example, if the sender 102 transmits a message to someone who does not want to communicate "I need to talk about the business deal" soliciting a response, then the automated response application operating on the user's mobile station may be setup to identify the sender by a categorization parsing function. The application may also be capable of parsing keywords from the message to include an automated response to such keywords based on the category of user.

In operation, the text interpretation server 104 may receive and process the content of the SMS message 148 by analyzing the words for certain keywords stored in the recipient's profile to which an automated response is warranted. For example, the recipient may block any and all communication from a particular sender by name or telephone number. Additionally, the context of the SMS message may be added to a list of terms and phrases or similar contextual information that is unacceptable to the recipient. For example, the term "business" or terms related to that term, such as "real estate", "software", etc., which are received near or next to that particular term, may trigger an automated blocking response 149 that the user is not accepting any more messages at this time and to refrain from attempting to contact the user.

Figure 2A:
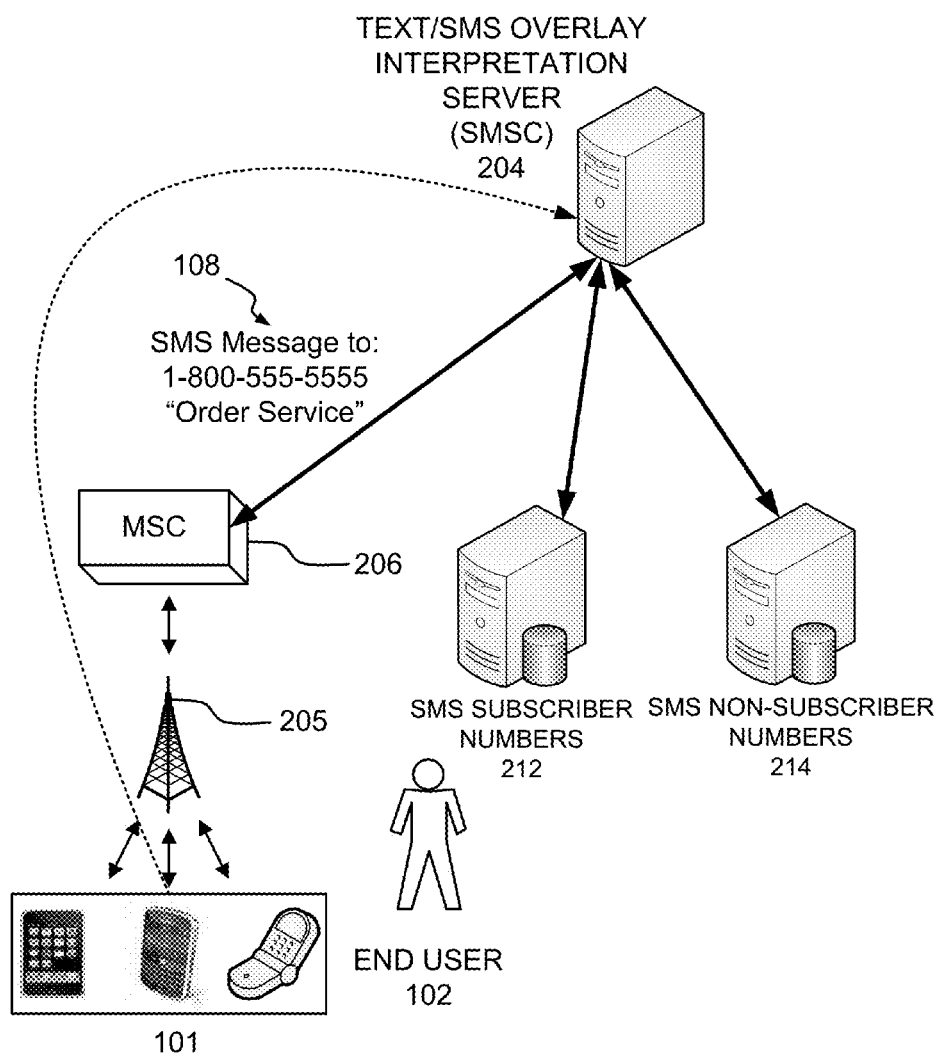
FIG. 2A illustrates an example network configuration with details of the SMS message intercepting/overlay system, according to example embodiments of the present invention.

FIG. 2A illustrates an example SMS overlay configuration 200 according to example embodiments. Referring to FIG. 2A, when a user 102 generates a SMS message via his or her smartphone or computing device 101 and sends it to a recipient telephone number, the message will be transferred from his or her mobile station device 101 and transmitted to a local cellular communications network including a base station 205 and corresponding mobile switching center 206. The SMS message will be identified at the MSC 206 via a corresponding SMSC device, such as text interpretation server 204. The SMS server 204 may intercept the message thereby disallowing any further communications to ensue once the interception has taken place.

The operation of the SMS server 204 may include identifying the SMS message 108 and parsing the SMS message to filter all keywords including the destination telephone number. The destination telephone number "1-800-555-5555" may be identified and used as a basis for a search or query operation against all SMS subscribers and SMS non-subscribers in corresponding databases 212 and 214. The subscribers 212 may be setup to have an alias telephone number used as an identification parameter for having the SMS message forwarded to the alias telephone number which is setup for a particular user ID and account. For example, a user may have a vanity '1-800' telephone number used as an alias for a regularly subscribed user mobile station number so all SMS messages received that are destined for the '1-800' number may instead be re-routed to the alias subscriber number associated with that account.

According to another example, the SMS overlay server 204 may receive a SMS message and parse the telephone number "1-800-555-5555" associated with the SMS message received 108. The number may then be compared to the SMS subscribers of database 212 and the non-SMS subscribers of database 214. If the number "1-800-555-5555" is identified as being part of the SMS non-subscribers group then the number may not be associated with any SMS capable device. However, the customer in this case, the cable company, may be associated with an entry in the non-subscriber database 214. As a result, the cable company may be configured to have the SMS messages sent to "1-800-555-5555" identified, intercepted and parsed for additional actions to be performed.

Examples of the additional actions performed by the SMS server 204 may include having the SMS server 204 perform an automatic response SMS message transmitted from the server 204 to the end user device 101. For instance, the SMS message response may be to let the user know that a particular number must be called in order to receive assistance. Other options may be to parse the message at the server 204 for a particular type of message parameter, such as "order", "account", "pay bill", "cancel", and use that parameter as the basis for a response by pairing the parameter to a particular department telephone number and/or extension and transmitting that information back to the user via a SMS message with the pertinent information included. Another option would be to identify a user desiring to buy new service or order a movie and have an automated dial function call a service agent and connect the user by dialing his or her telephone number parsed from the SMS message metadata to provide such an ordering service option.

Figure 2B:
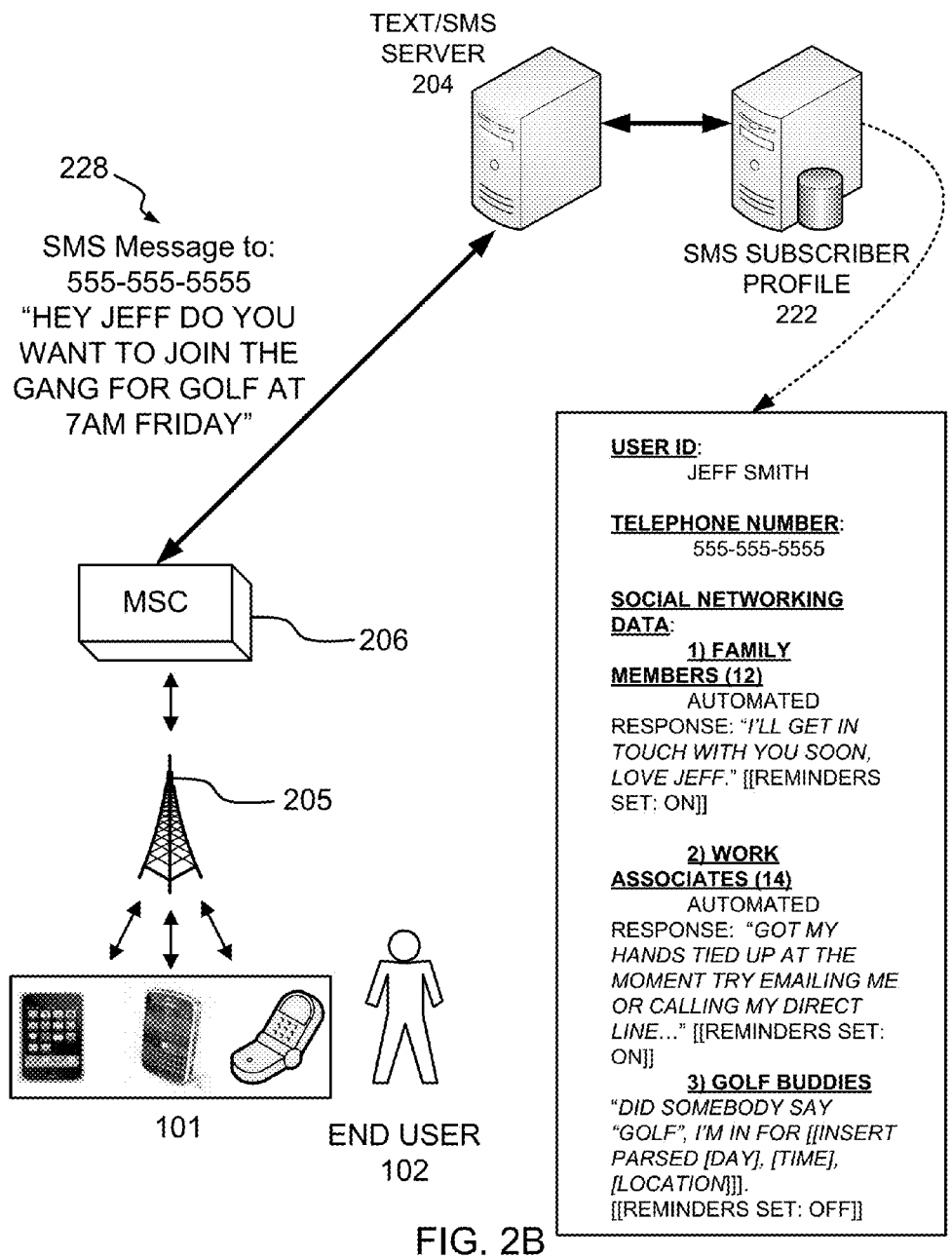
FIG. 2B illustrates another example network configuration with an SMS message automated response system, according to example embodiments of the present

FIG. 2B illustrates another example SMS interpretation and automated response configuration 220 according to example embodiments. Referring to FIG. 2B, when a user 102 generates a SMS message and sends it to a recipient telephone number, the message will be transferred from his or her mobile station subscriber device 101 and transmitted to a local cellular communications network including a base station 205 and corresponding mobile switching center 206. The SMS message will be identified at the MSC 206 via a corresponding SMSC device, such as text interpretation server 204. The SMS server 204 may receive, parse, categorize and forward the SMS message to the intended recipient.

The operation of the SMS server 204 may include identifying the SMS message 108 and parsing the SMS message to filter all keywords including the destination telephone number. The destination telephone number "555-555-5555" may be identified and used as a basis for a search or query operation to determine if the sender is part of the subscribers SMS profile information 222.

According to one example, the sender 102 may be a friend and part of the recipient's golf buddies. The categories and persons included in those categories of the subscriber's identification information may be setup by the subscriber prior to receiving the SMS message. For example, the subscriber may setup the automated response application to incorporate user subscriber information from a social networking website and profile (e.g., Twitter®, Facebook®, LinkeIn®, MySpace®, Google+®, etc). The information may include groups of friends, such as family, co-workers/associates, friends, golf buddies, etc.

Those separate groups may each have predetermined automated responses setup to respond to SMS messages according to the corresponding category. For example, if the sender 102 transmits a message to his friend "Hey Jeff do you want to join the gang for golf at 7 am Friday?" soliciting a response, then the automated response application operating on the user's mobile station may be setup to identify the sender by a categorization parsing function that identifies the user 102 by name and/or telephone number as being a "golf buddy" category of the subscriber SMS automated response application. The application may also be capable of parsing keywords from the message to include an automated response to such keywords based on the category of user. For example, if all messages pertaining to setting up a golf day are to be responded in the positive and to reaffirm time, place, and day, then certain words may be parsed from the first message and included in the response message as illustrated in FIG. 2B. The example for golf buddies may identify the sender as a golf buddy and the SMS message as having a tee-time included in the SMS message. In this case, the automated response may provide "DID SOMEBODY SAY "GOLF", I'M IN FOR [[INSERT PARSED [DAY], [TIME], [LOCATION]]]. The brackets indicate parsed parameters if any that are taken from the original message and placed in the response message. Since the original SMS message 108 included such information the parsed data would result in a response SMS message of "DID SOMEBODY SAY "GOLF", I'M IN FOR 7 AM FRIDAY. Since the original SMS message did not specify a location then the response SMS message may not respond with such information and may only include a time and day without a specified location. Also, a reminder service may be used to incorporate a calendar application entry or reminder SMS message when the time approaches. In this case, the reminder is set to "OFF" since Jeff may not have a hard time remembering when it is time to golf.

Other examples of social groups may include 'FAMILY MEMBERS', which has '(12)' members currently on the list. As a result, an automated response setup by the subscriber may be: "I'LL GET IN TOUCH WITH YOU SOON, LOVE JEFF." In this case, the reminders may be set to "ON" so the subscriber does not forget to call his family member who he missed. Similarly, a separate category may be setup for 'WORK ASSOCIATES', which currently has '(14)' members. An example automated response may be "GOT MY HANDS TIED UP AT THE MOMENT TRY EMAILING ME OR CALLING MY DIRECT LINE . . . " The "REMINDERS" may also be set to "ON" since the subscriber may not want to forget to call his boss or secretary back later.

The automated SMS response messages may be generated after 10 minutes or whatever time the user specifies. The user may try to answer all SMS messages directly but if 10 minutes elapses and no response is sent then the automated application response message may be generated and sent accordingly. Also, the user may setup exactly what words or phrases are to be parsed, whether to allow automated responses or not, whether to remind the user or not when a certain amount of time has elapsed, etc.

Figure 2C:
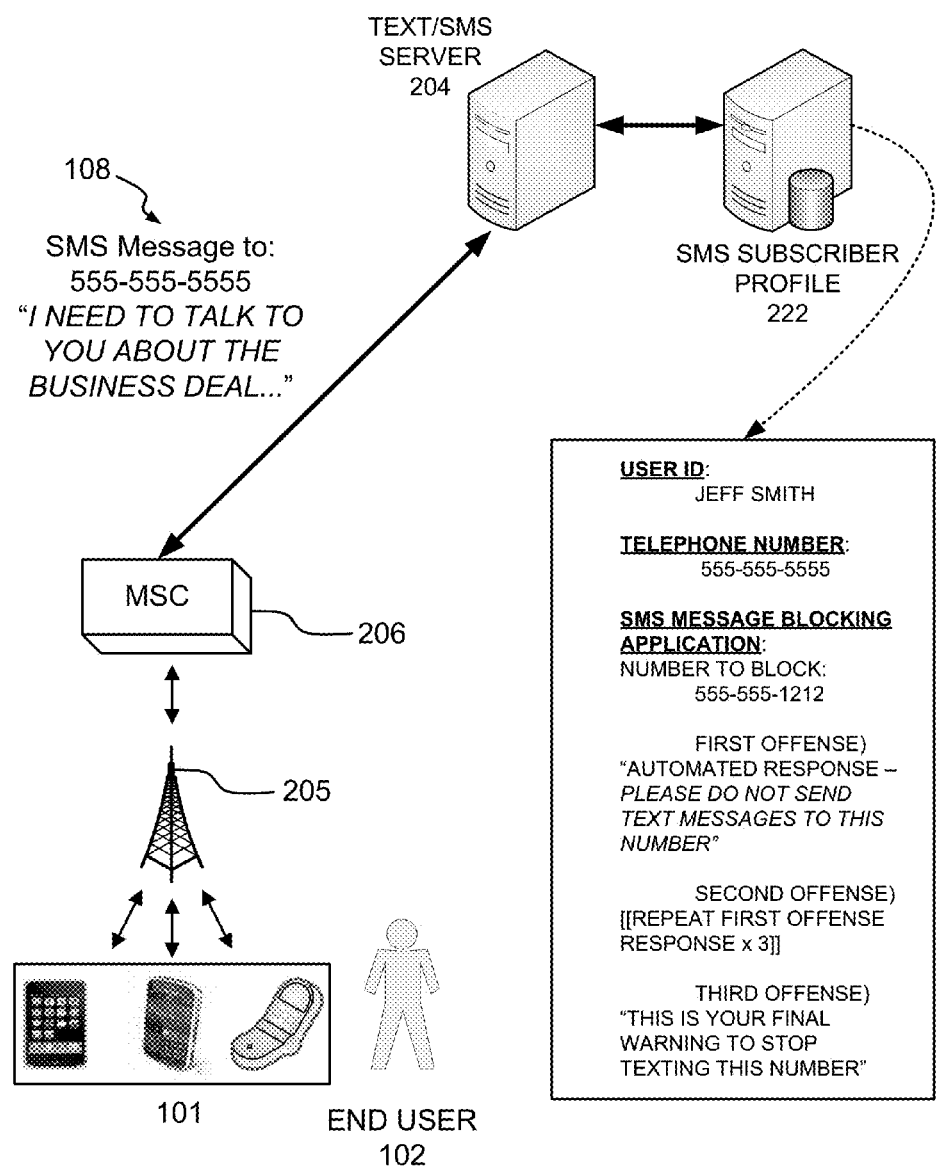
FIG. 2C illustrates another example network configuration with a SMS message intercepting and/or blocking security system, according to example embodiments of the present invention.

FIG. 2C illustrates another example SMS interpretation and automated response configuration 240 according to example embodiments. Referring to FIG. 2C, when a user 102 generates a SMS message and sends it to a recipient telephone number, the message will be transferred from his or her mobile station subscriber device 101 and transmitted to a local cellular communications network including a base station 205 and corresponding mobile switching center 206. The SMS message will be identified at the MSC 206 via a corresponding SMSC device, such as text interpretation server 204. The SMS server 204 may receive, parse, categorize and forward the SMS message to the intended recipient.

The operation of the SMS server 204 may include identifying the SMS message 108 and parsing the SMS message to filter all keywords including the destination telephone number. The destination telephone number "555-555-5555" may be identified and used as a basis for a search or query operation to determine if the sender is part of the subscriber's SMS profile information 220.

According to one example, the sender 102 may be an undesired party. The list of undesired persons included in those categories of the subscriber's identification information may be setup by the subscriber prior to receiving the SMS message. For example, the subscriber may setup the automated response application to include a list of telephone numbers or persons from whom the subscriber does not desire to receive SMS messages. Also, the context of the message may be interpreted by a context interpretation algorithm to determine whether any keywords previously specified by the user and stored in memory are contextually related to the received SMS message contents. If so, the message may be subjected to an immediate blocking response and/or response message that handles the message according to the recipient's response preferences.

The subscriber may also setup his or her own response strategy. For example, since all people are different, the subscriber may try a friendly approach at first, such as, for a first offense, a SMS response may be generated that kindly indicates "Automated response—please do not send text messages to this number." As a second response, the subscriber may desire to send multiple messages to reinforce his or her preference not to be contacted, for example, by adding a multiplier of "3" the messages may be generated in response in triplicate and sent to flood a user's response interface in a manner that may elicit frustration so as not to be repeated in the future. As a third offense, the responses may begin to become increasingly direct and even threatening, such as "This is your final warning to stop texting this number." Other responses may be very direct to begin with, such as "the next time you send a text message to this number, I will notify the authorities." This application that operates on the subscriber's mobile device 111 may offer flexibility and options when trying to dissuade others from contacting him or her via text messaging. All these responses may be automated so as to not interfere with the recipient's actual time or energy.

Figure 2D:
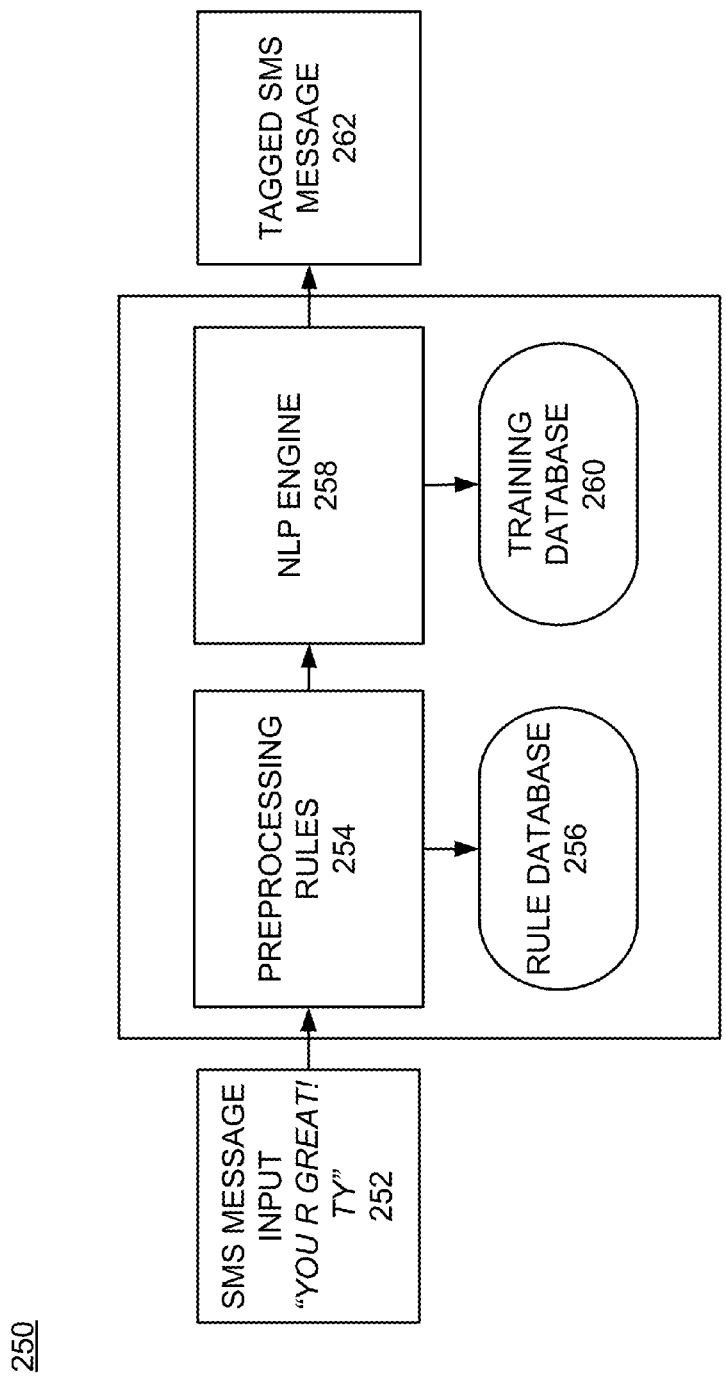
FIG. 2D illustrates an example logic diagram for performing a SMS text message interpretation and classification.

FIG. 2D illustrates an example logic diagram of SMS message text classification procedure according to example embodiments. Referring to FIG. 2D, the SMS message may have been created and forwarded to as an input message that is intercepted by the SMS text classification module 250. The message undergoes an evaluation phase that identifies the various words and their corresponding contexts. The message in this example reads "you r great! Ty". The call processing system that would have intercepted this message may then transmit the message 252 to a preprocessing rules module 254. A web service call would be one example of how the procedure is initated.

The preprocessing rules module 254 may receive and identify the message words by counting the number of words, identifying the various punctuation and attempting to apply text processing rules to optimize the message. For example, terms such as "r" or "u" may be linked to aliases such as "are" and "you", respectively. Capitalization is mandatory for first words and people's names, etc. The short hand notation may be removed and replaced via a rules processing module and/or library of rules. The revised text may include "You are great! Thank you!" The rules are stored in the rule database 256 and applied when the terms are identified and compared to the rules in the database 256.

A natural language processing engine (NLP) 258 may be applied to identify pre-classified utterances stored in the training database 260. The processing may use a combination of Bayesian classification and regular expression to identify the intent of a given SMS utterance. An intent may be extracted from the training database 260 and appended to the message as an add-on term, a color coded scheme, an italicized word or other indicator to provide an emotion or theme, such as "APPRECIATION". The selected intent may provide a pivotal point in the SMS processing. For example, certain themes, such as "GREETINGS", "APPRECIATION", "FAMILY CONCERNS", "ROMANCE" may be accepted based on a user's profile of acceptable SMS purposes that can be received by the user device. Or, certain themes may be identified as requiring a particular type of automated response. Alternatively, the messages identified as "WORK", "BUSINESS", "MONEY MATTERS", "EXPENSES", may instead be allowed through without delay or may be subject to the user's preferences for an automated response. The user's profile may be stored in the interpretation server 104 and may be linked to the rule database 256 when the SMS message is being processed.

In operation, the processed message may be linked to a particular intent. The identified intent(s) may serve as a trigger to initiate the intended recipient's profile stored in memory. The profile may be checked to determine whether a particular treatment of the message is required by the user's profile. For example, user profile: intent "WORK"—provide automated reply—"I'm out of the office—returning next week"—or automated intelligent reply—"This matter appears to be related to "EXPENSES", it is suggested you contact Brenda my assistant in Finance e-mail address Brenda@xyzcorp.com phone number 555-555-5555—and cc me on the emails. Thank you!"

In another example embodiment, an automated response system may be used to personalize SMS service replies or vanity SMS replies depending on the category of the identified sender, or the phone number of the sender. For instance, if a SMS message is identified "hey jeff—I'm in town next week wanna go for a run?" the application may be linked to the user's device and may silently intercept the messages with a similar ateway service to those identified above. The automated response feature may provide a web user interface that responds in cool/vanity ways. For example, "Jeff here—I'm sunning myself on vacation—don't bug me" or "I'm in Vegas baby!!!—we can [[insert verb]]{run} on the strip." or some other humorous or customized user response that identifies one or more action words form the text message—links them to the user's profile for a response type associated with a category intended for that particular sender.

Figure 2E:
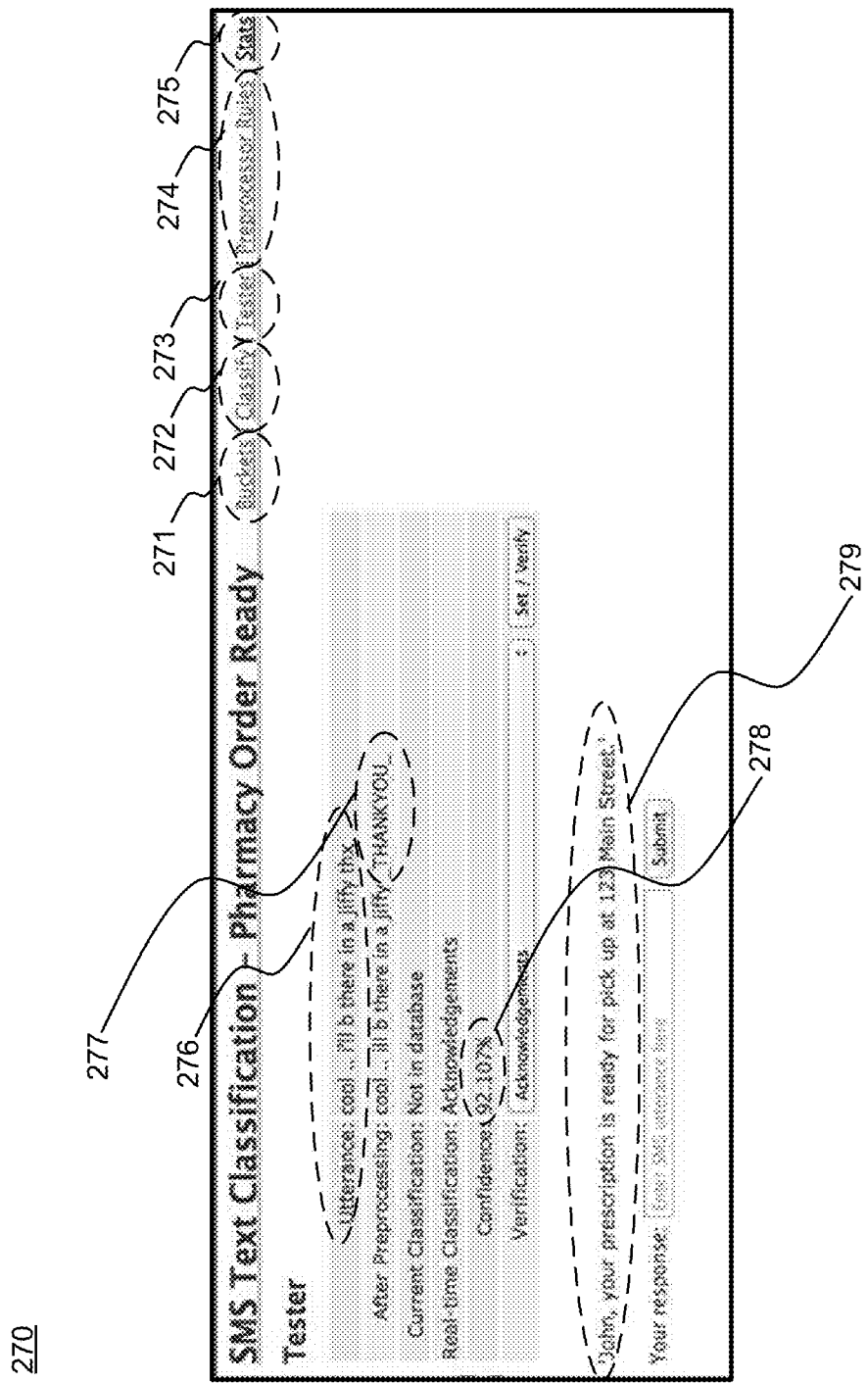
FIG. 2E illustrates an example graphical user interface application of automated message processing and message classification according to example embodiments of the present application.

FIG. 2E illustrates an example graphical user interface application of automated message processing and message classification according to example embodiments of the present application. Referring to FIG. 2E, the user interface 270 includes various automated response functions, such as an identification of the message itself in the utterance field 276 "cool . . . i'll be there in a jiffy thx." Once a message is received from an end user device or other message source the message may be pre-processed to identify any words of interest or words or phrases that are linked to common classification techniques included in a dictionary of terms stored as a file or files in memory. In this example of FIG. 2E, the term "thx" is a known alias of "THANKYOU", and the pre-processing provided a replacement term 277 "THANKYOU", which also yielded a confidence percentage 278 of 92%. Other replacement terms may be identified during a pre-processing operation in order to offer the user an opportunity to confirm the confidence percentage and determine whether to respond, ignore the opportunity or verify the message for future pre-processing success.

In FIG. 2E, the options include the ability to view the buckets 271 that one or more messages are categorized into when received, a classify tab 272 which provides details on how the message words or phrases are classified, a tester 273 which offers the menu 270 illustrated in FIG. 2E, a pre-processor rules tab 274 which provides details on how the message is pre-processed and a statistics "stats" tab 275 which provides details of how the message is statistically categorized. The message originally transmitted to the end user 279 is illustrated for reference purposes.

The virtual or data message queues "buckets" are used to organize and categorize the types or messages received from end users. The messages may be short message service (SMS) messages received from the end user(s) smartphones. In one example, an automated message may be transmitted to the user's mobile device when a certain trigger initiates the message creation and/or transfer. For example pharmacies are using text messaging to inform individuals when their prescriptions are ready. In some instances, the pharmacist may enter the information into the computer system to print a receipt that corresponds to the prescription. Such actions may trigger a SMS message generation function that creates or selects a preconfigured SMS message that can be promptly transferred to the user's mobile device via a pre-registration record for the user and his or her mobile device number.

Once an initial message is transferred to the user's mobile device or smartphone, the user may be provided with an opportunity to respond by submitting a response SMS message. The user may be extending appreciation by thanking the message initiation party. The user may instead ask questions about the prescription, such as what is its name, what are the side effects, how is it to be administered, who can provide feedback about one or more questions, how much it costs, whether the insurance covered the prescription, whether it is the name brand or generic version, etc.

Figure 2F:
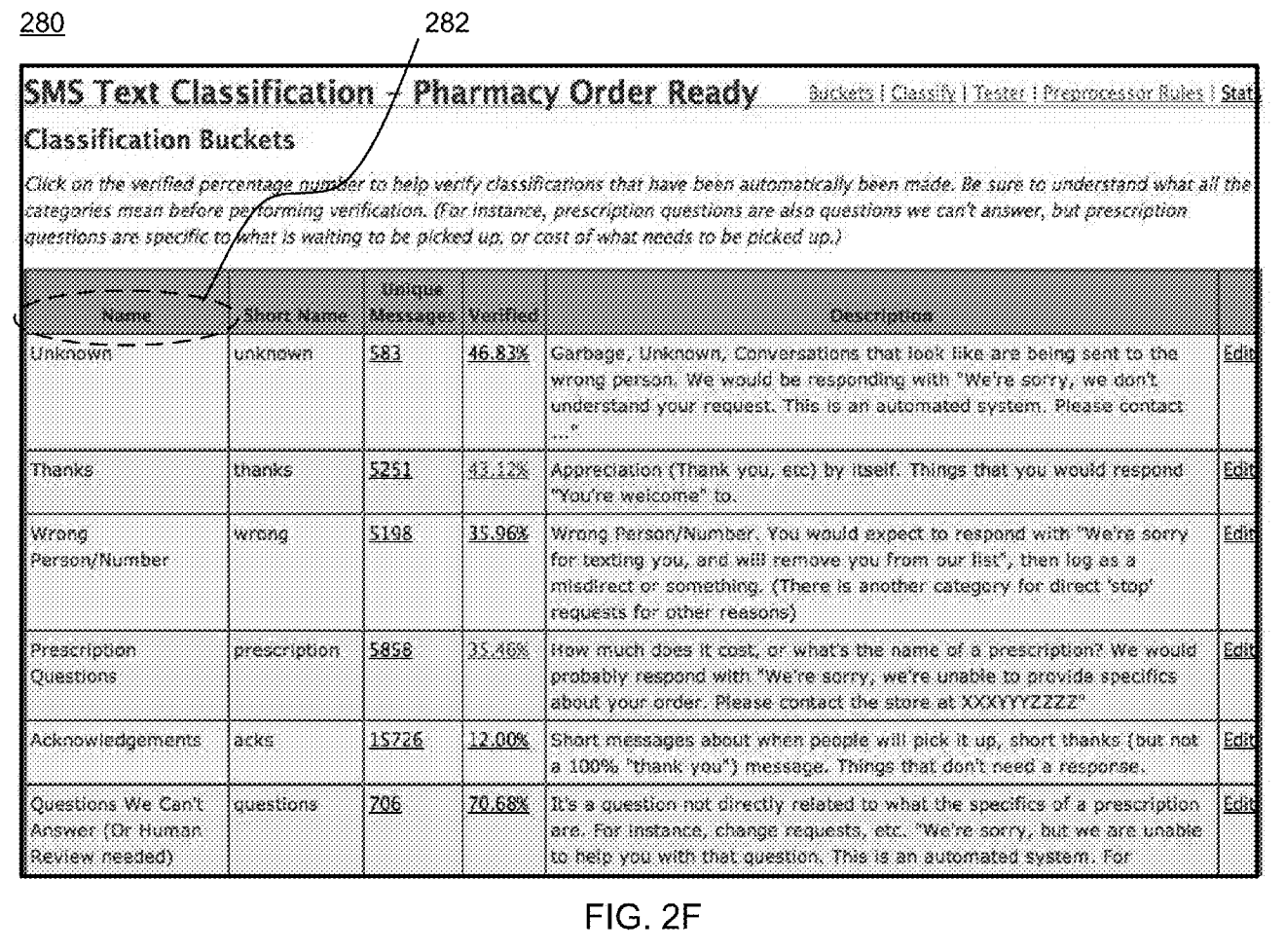

FIG. 2F illustrates another example graphical user interface application of automated message processing and bucket classification according to example embodiments of the present application. Referring to FIG. 2F, the text classification into buckets 280 is illustrated as having a bucket name in the first column 282 used to identify a bucket category. The pre-processing operation may identify, parse and process one or more words from the user's response message received. As a result, a preliminary bucket assignment or classification may be performed so a suggested course of action may be identified, such as ignore, respond with a generic "your welcome" response, ask additional questions, apologize for not understanding, suggest a name removal function to eliminate future responses, try to respond to a question based on the context of the message, etc.

FIG. 2G illustrates yet another example graphical user interface application of automated message processing for unverified messages for a particular bucket classification according to example embodiments of the present application. Referring to FIG. 2G, the menu 285 provides a list of unverified messages for the identified bucket "Thanks" 286. The user may identify the suggested responses as being correct or incorrect 287. The menu options permit the user to increase the relevancy and response accuracy for future automation success when responding to user messaging.

Figure 2H:
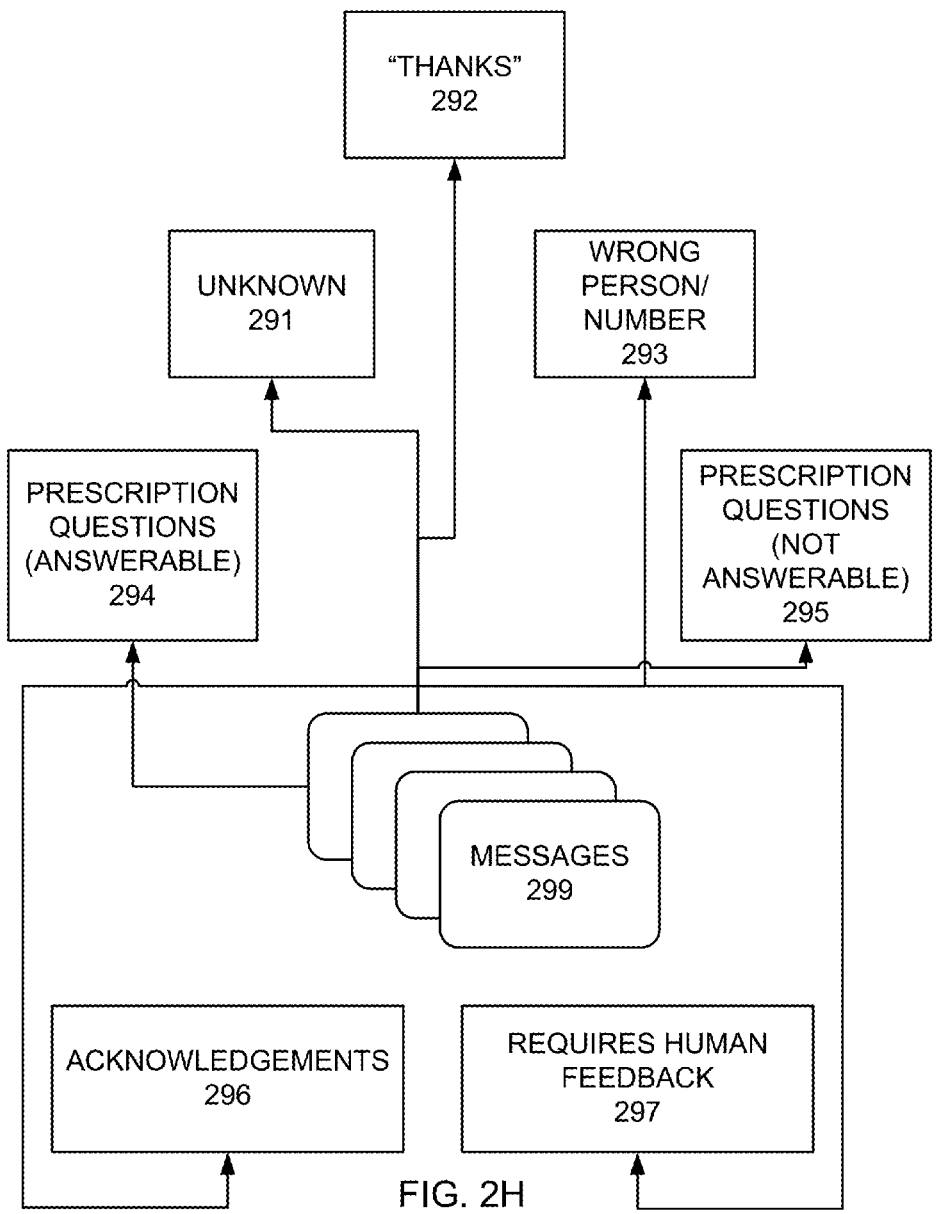
FIG. 2H illustrates an example logic diagram of the bucket assignment classification procedure according to example embodiments of the present application.

FIG. 2H illustrates an example logic diagram of the bucket assignment classification procedure according to example embodiments of the present application. Referring to FIG. 2H, the messages 299 may represent the various user responses or user initiated responses received at a message processing server and/or related application. The results may be categorized into a number of preconfigured virtual or data queue buckets 290 each of which has a different category or classification associated with the bucket and a corresponding set of responses and processing functions associated with the buckets intended purposes. For example, the unknown bucket 291 may receive terms that are unknown and misunderstood by the automated response efforts. Those terms classified as unknown may be ignored and disregarded pending further review. Therefore, the messages classified as unknown may never be processed and no response may be generated. The bucket "thanks" 292 may represent a common bucket type where a user responds by transmitting some type of message indicating a gratitude or appreciation for the reminder or notification. Many common responses may be configured to be transmitted to the user device in response to having received this classification (i.e., gratitude) message type.

Other bucket types may include a wrong/person or number 293 which may attempt to automatically respond to a SMS message with an apology and option to withdraw from the automated responses to avoid frustrated end users who are believed to be mistakenly contacted via the automated message generation and response application. In the example of a pharmacy, the user may attempt to solicit more information about the prescription order by asking certain answerable questions, such as "how much is the order?", "can I have generic instead, does that save money?", "did the insurance process?", etc. Those messages may be set in a prescription question bucket of answerable questions 294. Questions such as "how many milligrams should I take for pain", "am I too old to take this medicine everyday?" and more physician related questions may be set aside in a bucket of unanswerable questions 295, which receive only a default response with no additional consideration. The acknowledgments category bucket 296 may be designated for messages received that are identified to not require a response, such as "on my way" or "thank you", etc. and another bucket may be designated for requiring human feedback 297 and those messages may be forwarded to a text message user or other designated respondent who may initiate a custom message in response to the user's inquiry.

Figure 3:
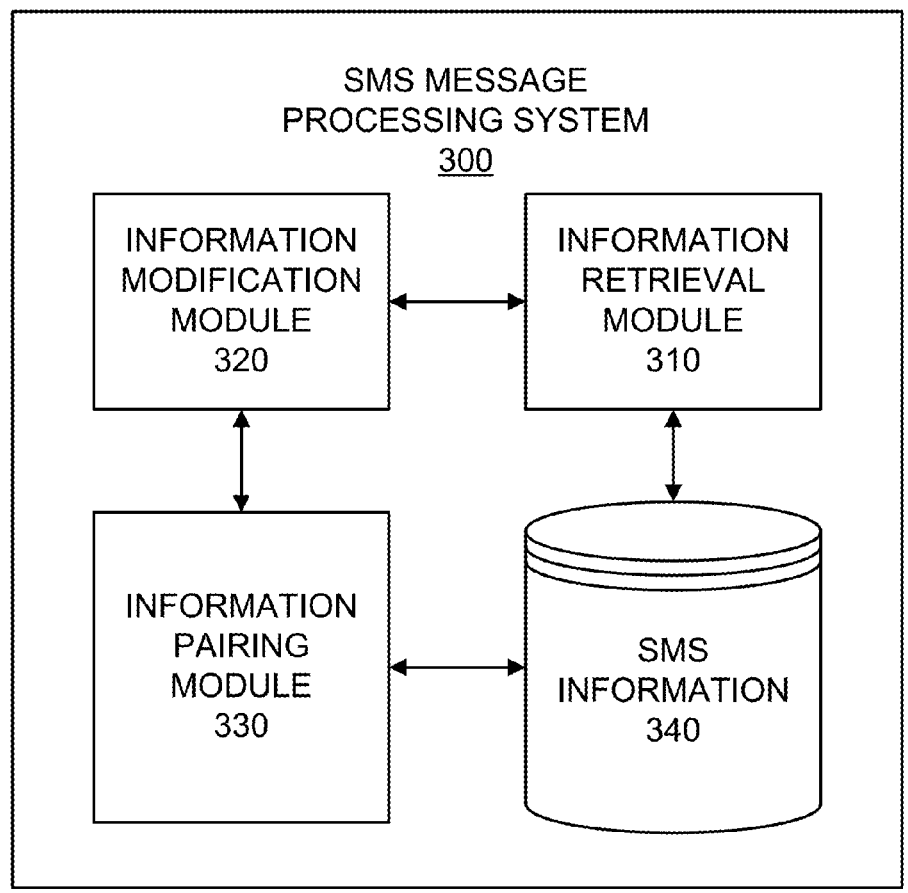
FIG. 3 illustrates an example system configuration of a SMS message overlay system, according to example embodiments of the present invention.

FIG. 3 illustrates an example SMS message processing system 300 configured to perform example methods of operations according to example embodiments. Referring to FIG. 3, the system 300 may include a receiver configured to receive a message at a message processing module or computer server. The message may invoke the identifying of the received message as including text information. The information in the message may provide a way to perform identifying the intended recipient of the message as an automated response subscriber via the information retrieval module 310, which retrieves a profile of the intended recipient from the SMS information database 340.

The information modification module may perform generating a response message on behalf of the automated response subscriber 320. The message may be a short message service (SMS) type message or a comparable text message format. The procedure of identifying the recipient as an automated response subscriber may include retrieving a user profile associated with the intended recipient, and identifying the message sender as belonging to a particular response category included in the user profile of the intended recipient. The particular response category may be identified from a plurality of different response categories each of which is assigned a different automated response message. The example method may also include identifying the intended recipient of the message as an automated response subscriber by identifying a telephone number of the intended recipient and retrieving a user profile associated with the intended recipient that specifies certain automated responses to be generated depending on a context of the message contents. The automated responses may be paired based on the context of the message via the information pairing module 330 to ensure the proper response is selected based on the information context of the message, the identified sender, etc.

Additional processing operations may include analyzing content of the message, assigning a context to the message, and pairing an automated response with the message that is associated with the context of the message. The method may also include transmitting the automated response to the sender without notifying the intended recipient and without transmitting the message to the intended recipient. The processing entity or server may intercept and handle all responses to the message and to the sender especially if the message, or user profile of the recipient, dictate that no message forwarding should be performed to the recipient depending on the message context or the sender's identity.

Another example method of operation may include receiving a message at a message processing server that is intended for a phone number associated with a customer service provider and identifying a telephone number of the sender of the message. The method may also include parsing at least one word from the message, retrieving user account information of the sender, and generating an automated response to the message that includes contextual information that is based on the user account information and the parsed word(s) from the message. The method may also include identifying the message as being a text message and redirecting the message to a text interpretation module which parses each of the words from the text message, and identifying a flagged word that is associated with at least one service provided by the customer service provider.

According to other examples, the flagged word being identified invokes an automated response that is generated to include at least one instance of the flagged word. For example, the response message may respond to an original message "I want to subscribe to movie channels" by saying "movie channel subscriptions are available by texting "movies" to short code 555555 right now or logging into your online account and selecting movie channel options." The flagged word may be associated with an entire set of response messages depending on the response categories stored in memory and the respective associations stored in memory. The instance information may include service upgrades, service support, and service offers. The method may also include processing the user account information of the sender to identify the current subscription status of the sender included in the user's account information, and generating a response message to the sender that references a subscription option or promotion currently available to the sender and transmitting the response message to the sender. Also, the information modification module 320 may receive another message from the sender responsive to the response message transmitted to the sender, and generate additional response messages and transmit the additional response messages to the sender which offer additional subscription options to the sender until the sender selects one of the options or requests live customer support.

According to another example embodiment, a method may include receiving a message intended for a particular recipient at a message processing server, identifying a sender of the message and/or a context of the message as being part of a predefined list of information included in a user profile account of the intended recipient. As a result, the predefined list of information may provide generating an automated response, and transmitting the automated response to the sender without alerting the user of the mobile station. The sender may be part of a list of parties on the predefined list of information who are not permitted to contact the recipient as specified by the recipient prior to receiving any messages.

The context of the message may also be identified as being associated with the predefined list of information that is not permitted to be forwarded to the intended recipient. Determining the context of the message may include determining the message is related to subject matter that is not permitted to be forwarded to the intended recipient, such as work related matters, finance matters, billing information, investment information, job changing information, coupons, etc.

The determining of the context of the message may include parsing a word from the message that matches at least one word from a list of words in the intended recipient's profile, and the method may also provide identifying the word as being part of an exclusion list of terms that are not permitted to be forwarded to the recipient's personal computing device. The method may further provide generating an automated response with first instructions to not attempt contacting the recipient, such as "please don't contact me at this number, thank you!", and transmitting the automated response to the sender. During the same sequence, additional automated responses may be transmitted to the sender device providing additional instructions to not attempt contacting the recipient. The additional instructions may be different from the first instructions and may be sent contemporaneously or in subsequent messages in response to additional messages received from the same blocked sender. This way, the responses appear to become increasingly aggressive and can automatically provide a way to maintain a firm response strategy without ever requiring the recipient to acknowledge the responses.

According to example embodiments, a statistical language model and/or Bayesian text classification may be performed to analyze the input SMS messages and corresponding data parsed from such messages. Text data analysis may include an algorithm that performs a guess as to what something is or is not. In other words, an input may be received and a corresponding output may be generated that is different and which is based on a guess operation. Providing an answer or result based on the input analysis is one operation, however, providing an accuracy model contemporaneous with that output may provide the user or the subsequent processing operations with some basis as to how the result was processed, identified and/or output. As a result, the example embodiments may output an answer or result and a corresponding confidence level for that result which represents a measure of accuracy for corresponding to that result.

This provides a second or additional level of decision making. For example, the application may be programmed to only trust results above a certain threshold depending on the goals and needs of the individual customer. For instance, a message that is processed to say "Thanks, you guys are awesome!" would have a result that is actually reduced or identified as a "Thank You" with a certainty level of 98%. As a result, the application may generate an automated response since the 98% certainty may exceed a predetermined threshold (i.e., 95%) which in turn provides such a response. The application may then respond with "You're welcome". However, if the user sent a response, such as "Thanks, but no thanks! I'm switching providers!", and the application identified that response as "Thank You", 21% sure. A response, such as "You're welcome" would be completely wrong and counterproductive since the customer is clearly not happy at this junction and needs a more customized response or access to a live agent.

According to example embodiments, a verification may be for updating the database with user confirmed suspicions, this term may be a "greeting", etc? and/or a verification that is used to train or calibrate the statistical language model, so it can provide more accurate classifications and increased confidence for those classifications. Assume that the application has not received any recent messages and a user accesses the training database, and verifies a message "Thanks, you guys are awesome!" as being confirmed that it's a valid "thank you" type of response. Then the next time the application processes something like "Thanks . . . awesome", the result may have a 99% certainty score instead of the previous 98% due to recent confirmations received.

As for the response "Thanks, but no thanks! I'm switching providers" this may be assigned to an "angry" bucket, and thus next time this type of text is received by the application, instead of a 21% likelihood of a "Thanks" message type, it may only be 10% likelihood of a "Thanks" message type and/or an even 60-70% angry likelihood type. The more database training exercises performed the more accurate the results will be for subsequent interactions.

Referring to FIG. 2F, the classification bucket menu provides a way to categorize messages into buckets. The "responses" are stored there as a guide to the trainer or the automated application to pick the correct bucket. Relevancy of a bucket assignment can be calculated so other buckets may be relevant or less relevant when assigning is performed. One example of bucket determination of a processed SMS message may provide analyzing text, such as "Thanks a lot! The result may be to put the text in Bucket A: 0%, Bucket B: 2.3%, Bucket C: 3.1%, Bucket D: 2.1%, Bucket "Thanks": 98%. The message would be designated a type of thanks or thank you message accordingly. Example of responses and classifications may provide for CVS/pharmacy, a bucket determination operation is initiated, and then the application may perform:

Bucket=AskNaturalLanguage Engine(Message)
   if(bucket="thanks") reply ("You're welcome")
   if(bucket="storehours") reply ("We're open until 10 pm").

In another use case where there is routing of SMS sessions to live people. There may be queues, similar to a call center, one for flowers, one for dining reservations, etc. A bessage sent in: "Need to buy my mom flowers!!" may provide a bucket lookup that returns "flowers". The result is then routed to an agent in the flowers group.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 4 illustrates an example network element 400, which may represent any of the above-described network components of the other figures, etc.

Figure 4:
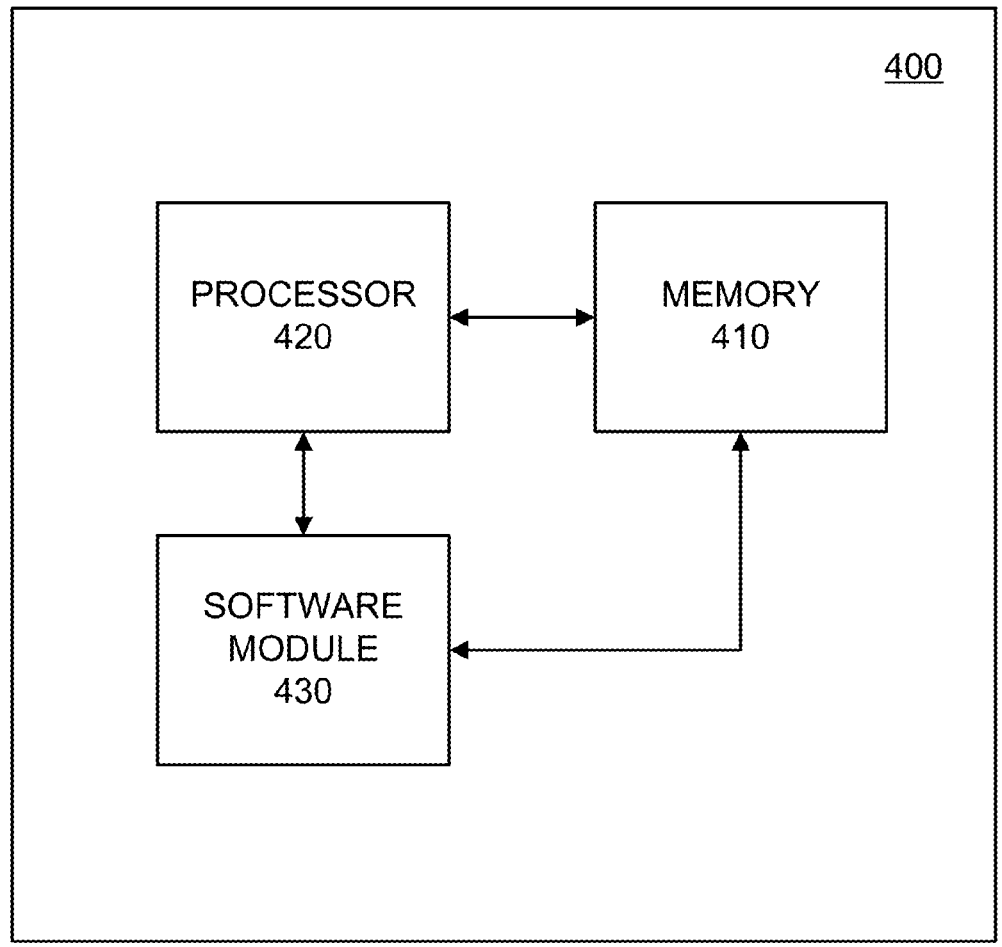
FIG. 4 illustrates an example network entity device configured to store instructions, software, and corresponding hardware for executing the same, according to example embodiments of the present invention.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. The computer readable medium may be a non-transitory computer readable medium that includes tangible hardware components in addition to software stored in memory. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Figure 5A:
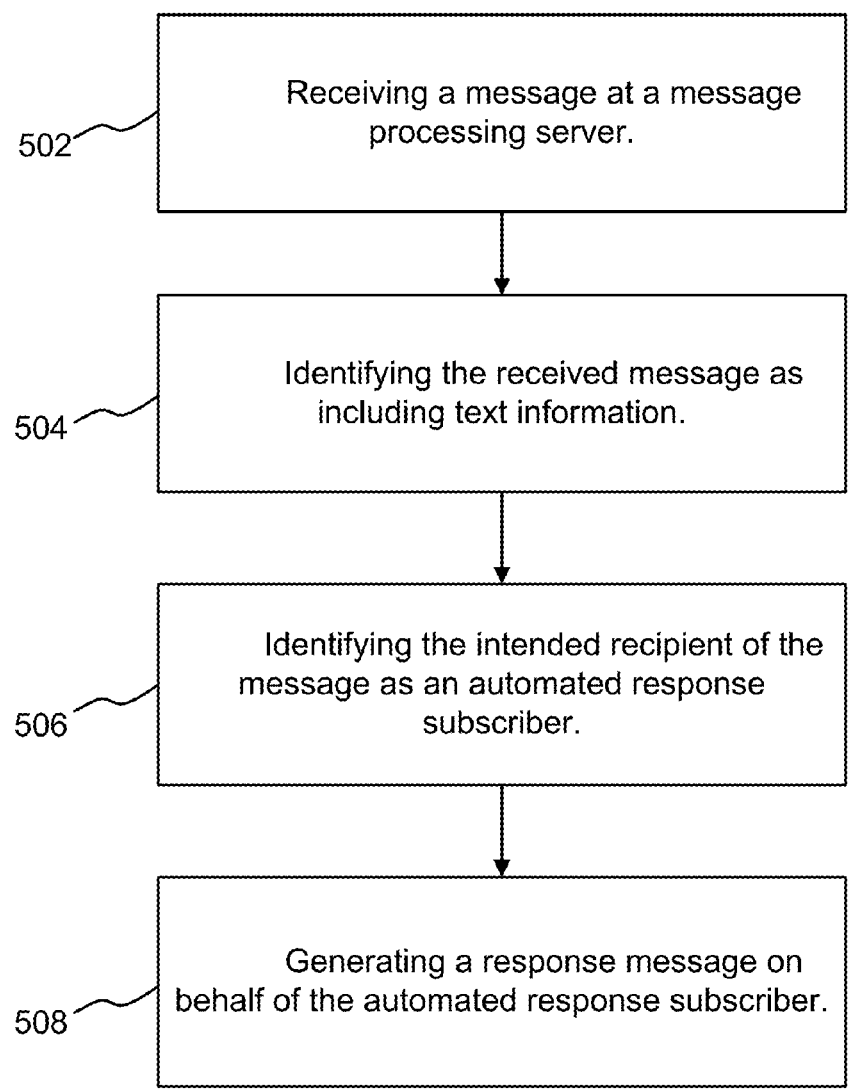
FIG. 5A illustrates a flow diagram of an example method according to an example embodiment of the present application.

FIG. 5A illustrates an example flow diagram of an example method of operation according to example embodiments. Referring to FIG. 5A, the method 500 may include receiving a message at a message processing server at operation 502, identifying the received message as including text information, at operation 504, identifying the intended recipient of the message as an automated response subscriber, at operation 506 and generating a response message on behalf of the automated response subscriber at operation 508.

Figure 5B:
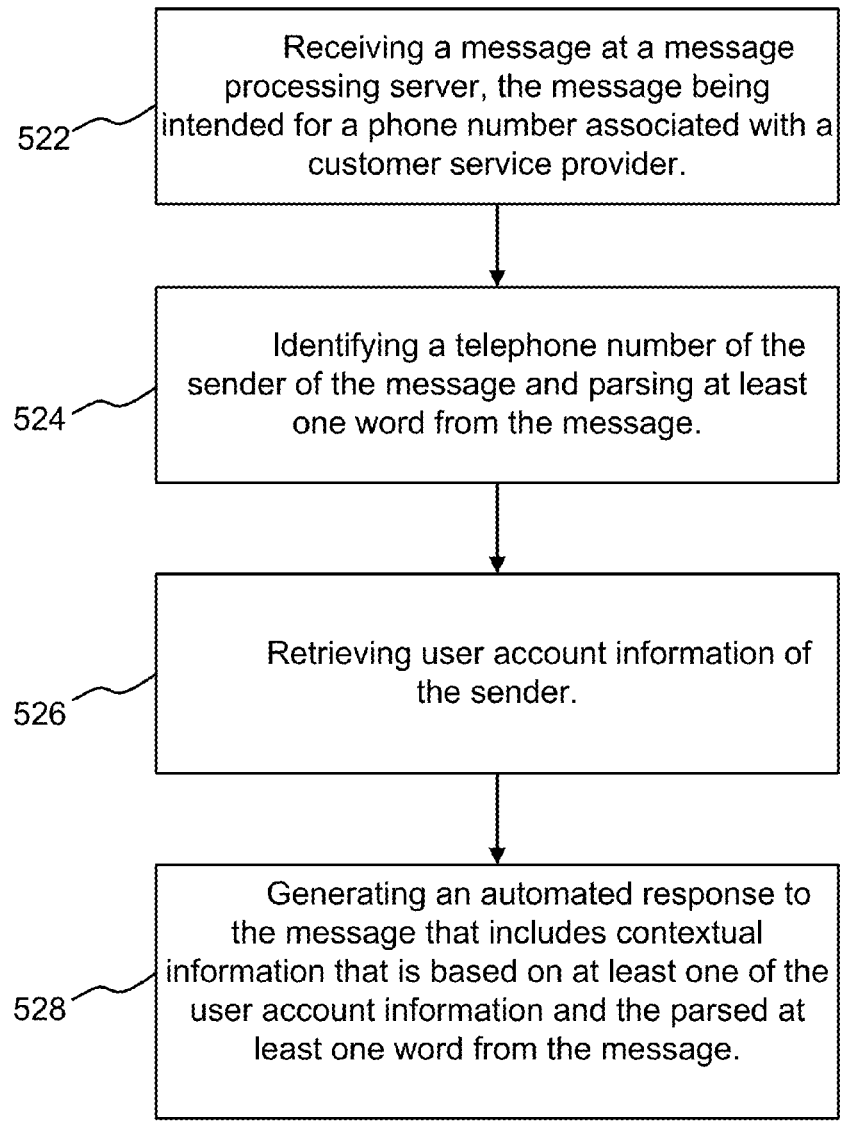
FIG. 5B illustrates a flow diagram of an example method according to an example embodiment of the present application.

FIG. 5B illustrates another example flow diagram of an example method of operation according to example embodiments. Referring to FIG. 5B, the method 520 may include receiving a message at a message processing server, the message being intended for a phone number associated with a customer service provider, at operation 522, and identifying a telephone number of the sender of the message at operation 524. The method may also include parsing at least one word from the message and retrieving user account information of the sender, at operation 526 and generating an automated response to the message that includes contextual information that is based on at least one of the user account information and the parsed at least one word from the message at operation 528.

Figure 5C:
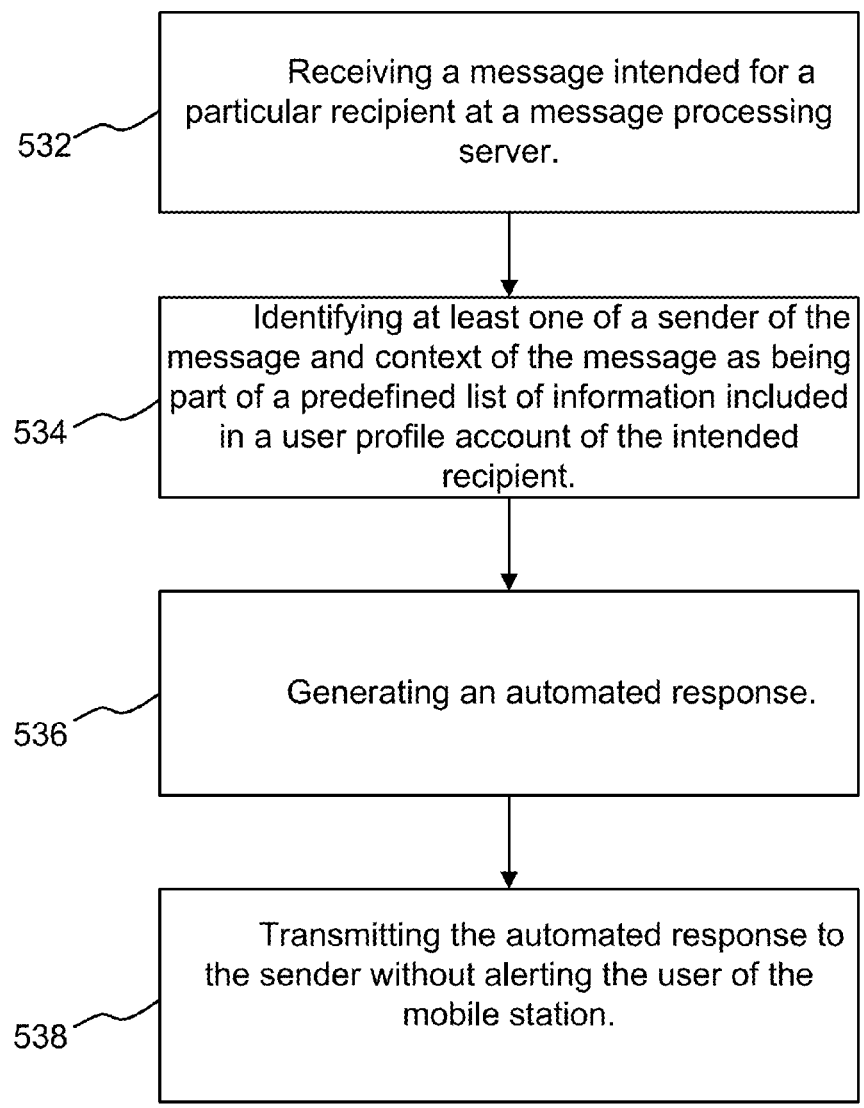
FIG. 5C illustrates a flow diagram of an example method according to an example embodiment of the present application.

FIG. 5C illustrates yet another example flow diagram of an example method of operation according to example embodiments. The method 530 includes receiving a message intended for a particular recipient at a message processing server at operation 532, identifying at least one of a sender of the message and context of the message as being part of a predefined list of information included in a user profile account of the intended recipient, at operation 534, generating an automated response, at operation 536 and transmitting the automated response to the sender without alerting the user of the mobile station at operation 532.

Figure 5D:
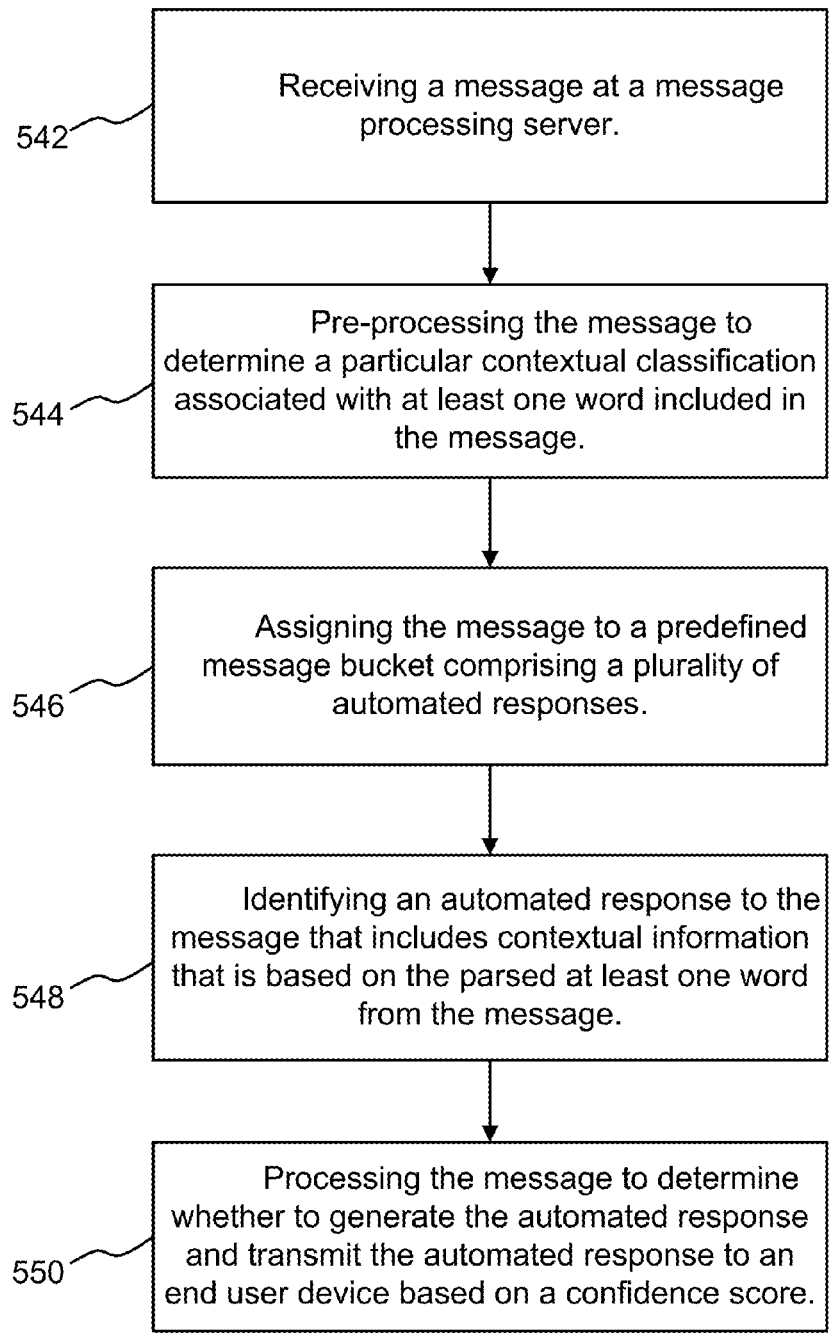
FIG. 5D illustrates a flow diagram of an example method according to an example embodiment of the present application.

FIG. 5D illustrates a still yet another example flow diagram 540 according to example embodiments. Referring to FIG. 5D, the example method of operation 540 may include receiving a message at a message processing server, at operation 542 and pre-processing the message to determine a particular contextual classification associated with at least one word included in the message, at operation 544. The method may also include assigning the message to a predefined message bucket that has a number of automated responses as possibilities, at operation 546 and identifying an automated response to the message that includes contextual information that is based on the parsed word from the message, at operation 548. The method may also include processing the message to determine whether to generate the automated response and transmit the automated response to an end user device based on a confidence score, at operation 550.

According to example embodiments, the message may be a short message service (SMS) type. The pre-processing the message may include parsing one or more words from the message as having an associated response category related to the context of the parsed word. Also, the assigning the message to the predefined message bucket may further provide selecting at least one of a number of different predefined message buckets. The assigned predefined message bucket may have a higher relevancy rating than the other plurality of different predefined message buckets based on a relevancy rating of the particular contextual classification associated with the at least one word included in the message. The assigned predefined message bucket has a corresponding list of responses that are relevant to the subjective content of the contextual classification associated with the word included in the message. Additionally, prior to assigning the message to the predefined message bucket, at least one term in the message is replaced with a known alias term linked to the predefined message bucket.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 3 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    receiving a message from a sender at a message processing server, the message being intended for a customer service provider;
    parsing at least one word from the message;
    generating an automated response to the message that includes contextual information that is based on at least one of account information of the sender and the parsed at least one word from the message;
    receiving another message from the sender responsive to a response message transmitted to the sender; and
    generating additional response messages and transmitting the additional response messages to the sender which offer additional subscription options to the sender until the sender selects one of the options or requests live customer support.

2. The method of claim 1, wherein the message is a short message service (SMS) type.

3. The method of claim 1, further comprising:
    identifying the message as being a text message and redirecting the message to a text interpretation module which parses each of the words from the text message; and
    identifying at least one flagged word that is associated with at least one service provided by the customer service provider.

4. The method of claim 3, wherein the at least one flagged word invokes an automated response that is generated to include at least one instance of the at least one flagged word which comprises information of at least one of service upgrades, service support, and service offers.

5. The method of claim 1, further comprising identifying a telephone number of the sender of the message.

6. The method of claim 1, further comprising retrieving account information of the sender.

7. The method of claim 1, wherein the message is intended for a phone number associated with the customer service provider.

8. An apparatus comprising:
    a receiver configured to receive a message from a sender intended for a customer service provider; and
    a processor configured to:
        parse at least one word from the message; and
        generate an automated response to the message that includes contextual information that is based on at least one of account information of the sender and the parsed at least one word from the message;
    wherein the receiver is further configured to receive another message from the sender responsive to a response message transmitted to the sender; and
    wherein the processor is further configured to generate additional response messages and transmit the additional response messages to the sender which offer additional subscription options to the sender until the sender selects one of the options or requests live customer support.

9. The apparatus of claim 8, wherein the message is a short message service (SMS) type.

10. The apparatus of claim 8, wherein the processor is further configured to:
    identify the message as being a text message and redirecting the message to a text interpretation module which parses each of the words from the text message; and
    identify at least one flagged word that is associated with at least one service provided by the customer service provider.

11. The apparatus of claim 10, wherein the at least one flagged word invokes an automated response that is generated to include at least one instance of the at least one flagged word which comprises information of at least one of service upgrades, service support, and service offers.

12. The apparatus of claim 8, wherein the processor is further configured to identify a telephone number of the sender of the message.

13. The apparatus of claim 8, wherein the processor is further configured to retrieve account information of the sender.

14. The apparatus of claim 8, wherein the receiver receives the message from the sender intended for a phone number associated with the customer service provider.

15. A non-transitory computer readable storage medium configured to store instructions that when executed cause a processor to perform:
   receiving a message from a sender at a message processing server, the message being intended for a customer service provider;
   parsing at least one word from the message;
   generating an automated response to the message that includes contextual information that is based on at least one of the account information of the sender and the parsed at least one word from the message;
   receiving another message from the sender responsive to a response message transmitted to the sender; and
   generating additional response messages and transmitting the additional response messages to the sender which offer additional subscription options to the sender until the sender selects one of the options or requests live customer support.

16. The non-transitory computer readable storage medium of claim 15, wherein the message is a short message service (SMS) type.

17. The non-transitory computer readable storage medium of claim 15, wherein the processor is further configured to perform:
   identifying the message as being a text message and redirecting the message to a text interpretation module which parses each of the words from the text message; and
   identifying at least one flagged word that is associated with at least one service provided by the customer service provider.

18. The non-transitory computer readable storage medium of claim 17, wherein the at least one flagged word invokes an automated response that is generated to include at least one instance of the at least one flagged word which comprises information of at least one of service upgrades, service support, and service offers.

19. The non-transitory computer readable storage medium of claim 15, wherein the processor is further configured to perform identifying a telephone number of the sender of the message.

20. The non-transitory computer readable storage medium of claim 15, wherein the processor is further configured to perform retrieving account information of the sender.

* * * * *